3,183,507
RADIO NAVIGATION SYSTEM
Paul G. Hansel, Greenvale, N.Y., assignor to Servo Corporation of America, Hicksville, N.Y., a corporation of New York
Filed Dec. 23, 1959, Ser. No. 861,550
6 Claims. (Cl. 343—106)

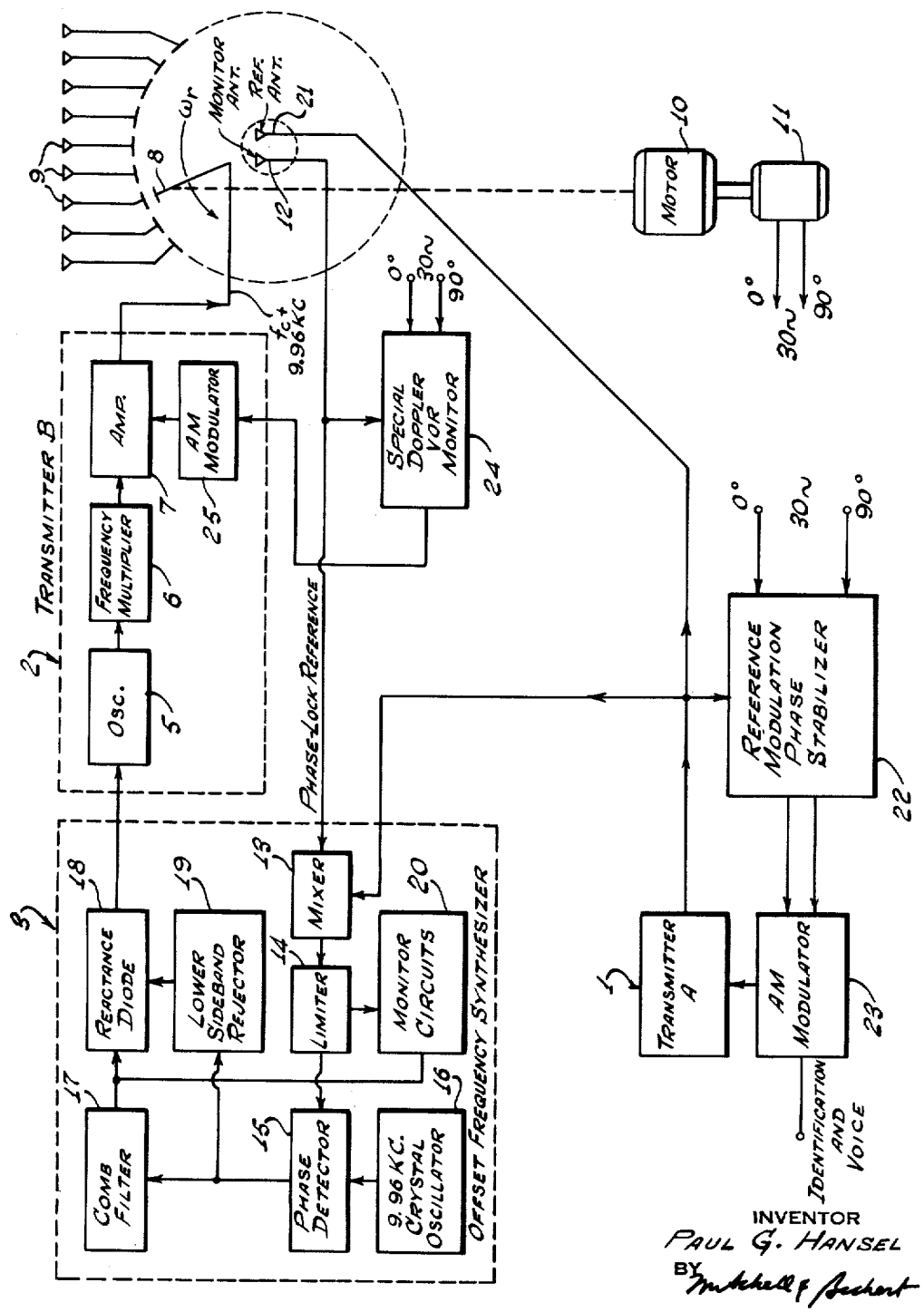

This invention relates to radio navigation systems and more particularly to radio beacon systems utilizing a ring of commutated antennas to simulate the energy pattern of a whirling antennna.

Some electronic information systems, such as Doppler omnirange navigation aids successively couple a source of signal energy to a plurality of radiating elements disposed in a ring or circle, in order to simulate closely the radiation pattern of the ideal radiator, a whirling antenna. For example, in one type of omnirange system, a reference signal is generated at a given frequency and a comparison signal is generated at a constant frequency-difference from the reference signal. The comparison signal is rotated effectively by successively coupling it to a plurality of radiating elements through a commutator and a measurement at a remote location of the Doppler frequency of the effectively rotated signal relative to the reference signal provides an indication of the azimuth of the remote location relative to the signal sources.

In such systems it is essential that the radiated signal simulate as closely as possible the signal which would be radiated by a whirling antenna. A whirling antenna would radiate a signal having a constant phase and amplitude, however, in a system using a commutated ring of antennas, the successive energization of the radiating elements introduces extraneous and objectionable amplitude and phase modulations having a frequency equal to the product of the commutation or scanning rate and the number of antenna elements in the ring.

One of the objects of this invention, therefore, is to provide means to reduce the extraneous modulations from the signal radiated from a plurality of successively energized antenna elements.

A feature of this invention is to derive at the center of a plurality of radiating elements a reference signal for the phase locked control loop of the signal energy source.

Another feature of this invention is to reduce the extraneous amplitude modulation in a signal radiated by a plurality of successively commutated radiating elements by detecting the objectionable modulations in a signal received by an antenna disposed at the center of the radiating system and utilizing this detected signal as inverse feed-back to modulate the source of signal energy.

The above mentioned and other objects and features of this invention will become more apparent by reference to the following description taken in conjunction with the accompanying drawing showing in block form a radio navigation beacon system including one embodiment of the phase and amplitude modulation correction circuits of the invention.

Referring to the drawing, a Doppler omnirange radio navigation beacon comprises a master signal source 1, transmitter "A," a slaved signal source 2, transmitter "B," a phase locked servo control loop 3 which adjusts the frequency of the output of signal source 2 to maintain a constant offset frequency or frequency difference in its output relative to the frequency of the signal output of source 1, and an antenna system for radiating the output of the signal sources 1 and 2.

The signal source 2 includes an oscillator 5 which has its output coupled to a frequency multiplier 6. The output of the frequency multiplier 6 is coupled through amplifier 7 to the commutator 8 of the antenna system 4.

The commutator 8 successively couples the energy from signal source 2 to a plurality of radiating elements 9, disposed in a ring or circle about a central point. In order to couple energy successively to each of the radiating elements 9 in the ring the commutator 8 is mechanically rotated by a motor 10, which also drives a two phase alternator 11. The radiation pattern of successively coupled radiating elements disposed in a ring closely simulates the pattern of a whirling antenna.

A monitor antenna 12 is disposed in the center of the ring or circle of radiating elements and receives the signals emitted therefrom. The signals received by the monitor antenna 12 are coupled to a mixer circuit 13 in the phase locked servo control loop circuit 3. The other input to the mixer 13 is a wave coupled from the signal source 1, and having, for example, a frequency $f_c$. The output of the mixer 13 is limited in circuit 14 and coupled as one input to a phase detector 15. The other input to the phase detector 15 is the output of a crystal controlled reference oscillator 16 which produces a signal having a frequency equal to the desired frequency separation between the signal sources 1 and 2, e.g. 9.96 kc.

The output of the phase detector 15 corresponds to the difference in frequency or phase of the signals radiated from the antenna elements 9, and the difference frequency 9.96 kc. The output of the phase detector 15 is filtered in circuit 17 and utilized as an input to a reactance device such as a diode 18. In accordance with well known engineering principles, the output of the reactance device 18 is coupled to the oscillator 5 of the signal source 2 to adjust the frequency of its output. In order to assure that the oscillator 5 operates at the proper sideband, a sideband rejector circuit 19 is provided. Monitor circuits 20 in the phase locked servo control loop circuit 3 provide an indication of the malfunctioning of any component in the system.

The master signal source 1, transmitter "A" has its output coupled to a reference antenna 21 also located centrally of the antenna ring 9. In order to phase stabilize the reference signal output from the source 1, a reference modulation phase stabilizer 22 is provided having as one input the signal from the source 1 and as the other input a pair of signals ninety degrees out of phase and having a frequency equal to the rate of rotation of the commutator 8. This pair of signals is obtained as an output from the two phase alternator 11 which is driven by the commutator motor 10. The stabilizer circuit 22 has its output coupled through the modulator 23 to the signal source 1. The modulator 23 may also be used to impress voice or other information bearing signals as a modulation of the reference signal radiated from the reference antenna 21.

The signals received by the monitor antenna 12 are also coupled to special monitor circuits 24 where the extraneous and objectionable amplitude modulation of the signals radiated by the ring of elements 9 are detected and coupled as inverse feedback to the amplitude modulator circuit 25 in the signal source 2. The output of the modulator 25 is coupled to the amplifier 7 to compensate and thus eliminate the objectionable amplitude modulation from the output of the commutated elements 9.

Thus, by deriving the phase locked reference signal which is coupled to the mixer 13, from the monitor antenna 12, and designing the phase control servo loop 3 to exhibit high gain at the frequency of the product of the number of radiating elements 9 and the scanning rate of the commutator 8, the actual phase of the output of signal source 2 is purposely caused to fluctuate in such a manner that the phase of the signal radiated from elements 9 at the center of the ring remains constant, as it does in the case of a whirling antenna. Deriving the phase reference from the monitor antenna 12 located in the center of the ring, in this manner enables the phase locked control loop 3 to compensate for the inevitable phase modulation which is produced by a capacity type commutator or distributor even when driven from a zero impedance source of absolutely fixed frequency.

Deriving the phase reference signal from the monitor antenna is preferable to deriving it directly from the output of signal source 2 for compensating the inevitable phase modulation due to the commutator. Moreover, the extraneous amplitude modulation due to the commutation of the elements 9 is fed back to the modulator 25 of signal source 2 and is used to suppress the amplitude modulation of the radiated signal which is due to the blending law in the commutator 8.

The effect of the two feedback features (amplitude and phase control signals) derived from the signals received by the monitor antenna at the center of the antenna ring, is to cause the signal at the center of the antenna system to correspond very closely to the ideal signal which would be radiated from a simple revolving or whirling antenna. This system tends to limit the extraneous modulations to that which is associated with the spacial relationships among the elements and with the parasitic excitation of inactive elements and tends to eliminate those modulations due to the commutation of the plurality of radiating elements in the ring.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a radio beacon system, a plurality of radiating elements, a first source of signal energy, a second source of signal energy and means for successively coupling said second source of signal energy to said radiating elements, means to supress extraneous modulations of the radiated energy due to the successive coupling of the second source of signal energy to the plurality of radiating elements comprising antenna means spaced from said radiating elements for receiving said radiated energy, means coupled to said antenna means for detecting the extraneous modulations of said radiated energy, and means responsive to said detected modulations to maintain a constant frequency difference between said first and second sources of signal energy.

2. In a radio beacon system, a plurality of radiating elements, a first source of signal energy, a second source of signal energy and means for successively coupling said second source of signal energy to said radiating elements, means to suppress extraneous modulations of the radiated energy due to the successive coupling of the second source of signal energy to the plurality of radiating elements comprising antenna means spaced from said radiating elements for receiving said radiated energy, means coupled to said antenna means for detecting the extraneous amplitude and phase modulations of the radiated energy, means responsive to the detected amplitude modulations to inversely amplitude modulate said second source of energy, and means responsive to the detected phase modulations to adjust the phase of said second source of signal energy, said latter means comprising a portion of a phase control loop coupled between said antenna and said second source, and means coupling said first source to said phase control loop, said phase control loop automatically maintaining a constant frequency difference between said first and second sources of energy.

3. In a radio beacon system, a plurality of radiating elements, first and second sources of signal energy and means for maintaining said second source at a constant frequency difference from said first source, means for successively coupling said second source of signal energy to said radiating elements, means to suppress extraneous modulations of the radiated signal energy due to the successive coupling of the second source of signal energy to the plurality of radiating elements comprising antenna means spaced from said radiating elements for receiving said radiated energy, means coupled to said antenna means for detecting the extraneous amplitude modulations of said radiated energy, means to amplitude modulate said second source of signal energy and means coupling the output from said detecting means as inverse feedback to said amplitude modulating means to control the modulation of said second source of signal energy.

4. In a radio beacon system a plurality of radiating elements, first and second sources of signal energy and means for maintaining said second source at a constant frequency difference from said first source, means for successively coupling said second source of signal energy to said radiating elements, means to suppress extraneous modulations of the radiated signal energy due to the successive coupling of the second source of signal energy to the plurality of radiating elements comprising antenna means spaced from said radiating elements for receiving said radiated energy, means coupled to said antenna means for detecting the extraneous phase modulations of said radiated energy, and means coupled to said second source of signal energy responsive to said detected phase modulations to adjust the phase of the output of said second source of signal energy.

5. In a radio beacon system, a first source of signal energy coupled to a radiating element, a second source of signal energy successively coupled to a plurality of radiating elements disposed in a ring, means to reduce the extraneous phase modulation from the radiated signals introduced by the successive coupling of the second source of signal energy to the plurality of radiating elements comprising antenna means disposed centrally of said plurality of radiating elements, phase comparison means coupled to said centrally disposed antenna and to said first source of signal energy, said phase comparison means being operable to compare the phase of the output of said first source of signal energy and the output of said centrally disposed antenna to develop a control signal and means responsive to said control signal to adjust the phase of the output of said second source of signal energy to counteract said extraneous phase modulations.

6. The combination comprising a radio beacon system having a first and second sources of signal energy and means for maintaining said second source at a constant frequency difference from said first source, a first antenna system including a plurality of radiating elements disposed in a ring, a commutator coupled to said second source of signal energy for coupling the energy therefrom to a single element in said ring, motor means to cause said commutator to couple successively energy to each of said elements, a monitor antenna centrally disposed of said ring, means coupled to said monitor antenna to detect the amplitude modulation of the signals radiated by said plurality of radiating elements due to the commutation of said energy, means to modulate said second source responsive to said detected amplitude modulation signals, means to compare the phase of the signal received by said monitor antenna and the output of said first source and means responsive to said comparison means to adjust the phase of the output of said second source of signal energy.

References Cited by the Examiner
UNITED STATES PATENTS

| | | | |
|---|---|---|---|
| 2,298,930 | 10/42 | Decino | 250—17.53 |
| 2,769,159 | 10/56 | Moore | 340—6 X |
| 2,861,177 | 11/58 | Dishal et al. | 250—17.91 |
| 2,945,224 | 7/60 | Myers | 343—106 |
| 2,952,016 | 9/60 | Le Grand et al. | 343—106 |

CHESTER L. JUSTUS, *Primary Examiner.*